United States Patent Office
3,423,413
Patented Jan. 21, 1969

3,423,413
1-HYDROXY OR CHLORO BENZYL-2-[-4 METHYL, ETHYL OR HYDROXYETHYL-PIPERAZINO METHYL] BENZIMIDAZOLES
Hans Priewe, Dieter Rahtz, and Reinhard Hempel, Berlin, and Helmer Richter, Grafing, near Munich, Germany, assignors to Schering A.G., Berlin, Germany
No Drawing. Filed July 20, 1965, Ser. No. 473,512
Claims priority, application Germany, July 23, 1964, Sch 35,513; June 10, 1965, Sch 37,199, Sch 37,200
U.S. Cl. 260—268                    4 Claims
Int. Cl. C07d 51/70

ABSTRACT OF THE DISCLOSURE

A substance selected from compounds of the formula

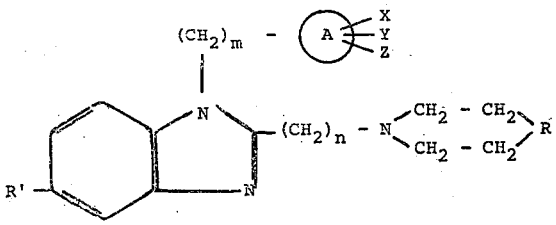

and salts of the compounds with physiologically tolerated acids, wherein

Ⓐ is a ring selected from the group consisting of benzene and pyridine rings,
X, Y, Z are members of the group consisting of hydrogen, halogen having an atomic weight of less than 100, hydroxyl, lower alkoxy, lower alkanoyl-oxy, lower-alkoxy-(lower)-alkoxy, and the nitro radical,
$m$ is an integer between zero and two,
$n$ is an integer between one and three,
R is a member of the group consisting of oxygen and N—R″, wherein
R″ is a member of the group consisting of hydrogen, lower alkyl, lower hydroxyalkyl, lower-alkanoyl-(lower)-hydroxy-alkyl, phenyl-(lower)-alkyl, and lower-alkoxy-(lower)-alkyl,
and wherein
R′ is a member of the group consisting of hydrogen, halogen having a molecular weight of less than 100, and lower-alkoxy.

An example is 1-(4-chlorobenzyl)-2-(1-methyl-4-piperazinyl)-methylbenzimidazole.

The compounds are useful agents against any kind of hypersensitivity and allergy.

This invention relates to benzimidazole derivatives, and particularly to benzimidazole derivatives which are physiologically active.

We have found that substances which are compounds of the formula

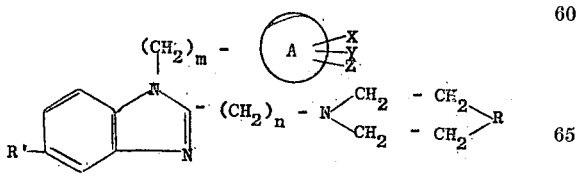

and salts of such compounds with physiologically tolerated acids are capable of modifying the effects of biogenous amines such as histamine, serotonin, and acetylcholine. The compounds of the invention thus have antiallergic effects, antiinflammatory effects, but they may also affect the central and vegetative nervous systems. They are capable of preventing spasms of smooth and striated muscles.

In the formula, Ⓐ is a benzene or pyridine ring. X, Y, Z may be hydrogen, halogen having an atomic weight lower than 100, hydroxyl, lower alkoxy, lower alkanoyloxy, lower-alkoxy-(lower)-alkoxy, and the nitro radical. $m$ is an integer between zero and two, and $n$ an integer between one and three. R is either oxygen or N—R″ wherein R″ may be hydrogen, lower alkyl, lower hydroxyalkyl, lower-alkanoyl-(lower)-hydroxyalkyl, phenyl-(lower)-alkyl, and lower-alkoxy-(lower)-alkyl. R′ may be hydrogen, halogen of a molecular weight below 100, or lower alkoxy.

Table I illustrates the antiinflammatory effects of a representative group of the benzimidazole derivatives of the invention. The therapeutic index for each of the listed compounds was determined by oral ingestion in rats in which kaolin edema was induced under standard conditions. The therapeutic index listed is the ratio of the median lethal dosage $LD_{50}$ to the dosage effective in reducing edema by 40%, $ED_{40}$. The well established antiinflammatory drug 3,5-dioxo-1,2-diphenyl-4-n-butylpyrazolidine (phenylbutazone) was subjected to the same test for comparison purposes.

TABLE I

| Compound: | Therapeutic index |
|---|---|
| 1 - (4-chlorobenzyl)-2-(1-methyl-4-piperazinyl)-methylbenzimidazole hydrochloride | 4 |
| 1 (4-chlorobenzyl)-2-[1 - (2 - hydroxyethyl)-4-piperazinyl]-methylbenzimidazole | 6 |
| 1 - (4-bromobenzyl)-2-(1-methyl-4-piperazinyl)-methylbenzimidazole | 4 |
| 1 - (4-chlorobenzyl)-2-(1-methyl-4-piperazinyl)-methyl-5-chlorobenzimidazole | 4 |
| 1 - [1-(4-chlorophenyl)-ethyl]-2-[1-(2-hydroxyethyl)-4-piperazinyl]-methylbenzimidazole | 4 |
| 1 - (4-chlorobenzyl)-2-[1 - (2-hydroxyethyl)-4-piperazinyl]-methyl-5-methoxybenzimidazole | 10 |
| 1 - (4-chlorobenzyl)-2-(1-methyl-4-piperazinyl)-methyl - 5 - methoxybenzimidazole dichlorohydrate | 4 |
| 1 - (2-hydroxybenzyl)-2-[1-(2 - hydroxyethyl)-4-piperazinyl]-methylbenzimidazole | 10 |
| 1 - (2-methoxybenzyl)-2-[1-(2-hydroxyethyl)-4-piperazinyl]-methylbenzimidazole | 4 |
| 1 - (2-acetoxybenzyl)-2-[1-(2 - acetoxyethyl)-4-piperazinyl]-methylbenzimidazole | 4 |
| 1 - (2-acetoxybenzyl)-2-(1-methyl-4-piperazinyl)-methylbenzimidazole | 4 |
| 1 - (2-hydroxy-3,5-dichlorobenzyl)-2-[1 - (2-hydroxyethyl) - 4 - piperazinyl]-methylbenzimidazole | 5 |
| Phenylbutazone | 4 |

Numerous benzimidazole derivatives of the invention have strong analgesic effects. Their pain mitigating effect was tested on mice in the copper plate test in comparison with the known analgesic agent 1-phenyl-2,3-dimethyl-4-dimethylamino-5-pyrazolone (aminopyrine). The results of these tests are listed in Table II relative to the effect of aminopyrine taken at the value of 1.

TABLE II

| Compound: | Analgesic effect |
|---|---|
| 1-(4-chlorobenzyl) - 2 - (1-methyl-4-piperazinyl)-methylbenzimidazole hydrochloride | 1 |
| 1-(4-chlorobenzyl) - 2 - (1-methyl-4-piperazinyl)-methylbenzimidazole | 1 |
| 1-benzyl - 2 - (1-methyl - 4 - piperazinyl)-methylbenzimidazole | 1 |
| 1-(4-chlorobenzyl) - 2 - (1-methyl-4-piperazinyl)-methylbenzimidazole | 1 |
| 1-(4-fluorobenzyl) - 2 - (1-methyl-4-piperazinyl)-methylbenzimidazole hydrochloride | 1 |

The antiallergic effects of representative benzimidazole derivatives of the invention are shown in Table III. Allergic phenomena result in the destruction of tissue mast cells, and in the liberation of histamine, serotonin, plasmakinines, and enzymes having proteolytic, esterolytic, and fibrinolytic activity. Such phenomena can be reproduced experimentally by intracutaneous injection of compound 48/80, a condensation product of p-methoxyphenylethyl-N-methylamine with formaldehyde. The effect of antiallergic agents on the substances liberated can be read in a known manner from this so-called Evans-Blue-Spreading Test on animals.

Results obtained with compounds of this invention and with well-known antiallergic agents under identical conditions are listed in Table III as effective dosage in 50% of the test animals (mg./kg.), together with toxicity as expressed by the lethal dosage for 50% of the animals ($LD_{50}$) when the compounds were applied intravenously (i.v.) and by mouth (p.o.).

TABLE III

| Compound | $LD_{50}$ I.v. | $LD_{50}$ P.o. | $ED_{50}$ |
|---|---|---|---|
| 1-(4-chlorobenzyl)-2-[1-(2-methoxy-ethyl)-4-piperazinyl]-methylbenzimidazole hydrochloride | 135 | 595 | 25 |
| 1-(4-pyridylmethyl)-2-[1-(2-hydroxyethyl)-4-piperazinyl]-methylbenzimidazole | 156 | 730 | 25 |
| 1-(2-acetoxybenzyl)-2-[1-(2-acetoxyethyl)-4-piperazinyl]-methyl-benzimidazole | 195 | 625 | 20 |
| 1-(2-pyridylmethyl)-2-[1-(2-hydroxyethyl)-4-piperazinyl]-methylbenzimidazole | 255 | 425 | 10 |
| 1-(4-chlorobenzyl)-2-[1-(2-acetoxy-ethyl)-4-piperazinyl]-methylbenzimidazole | | 625 | 20 |
| 1-(4-chlorobenzyl)-2-[1-(2-hydroxy-ethyl)-4-piperazinyl]-methylbenzimidazole | 113 | 625 | 7 |
| 1-benzyl-2-(1-methyl-4-piperazinyl)-methylbenzimidazole | 87 | 375 | 8 |
| 1-benzyl-2-[1-(2-hydroxyethyl)-4-piperazinyl]-methylbenzimidazole | 81 | 455 | 5 |
| 1-(4-chlorophenyl)-2-[1-(2-hydroxyethyl)-4-piperazinyl]-methylbenzimidazole | 113 | 385 | 10 |
| 1-(4-fluorobenzyl)-2-[1-(2-hydroxyethyl)-4-piperazinyl]-methylbenzimidazole | 158 | 435 | 0.3 |
| 1-(4-fluorobenzyl)-2-(1-methyl-4-piperazinyl)-methylbenzimidazole hydrochloride | 106 | 385 | 3.3 |
| 1-(3-chlorobenzyl)-2-[1-(2-hydroxyethyl)-4-piperazinyl]-methylbenzimidazole | 78 | 149 | 20 |
| 1-(4-chlorobenzyl)-2-(4-piperazinyl)-methylbenzimidazole | 103 | 540 | 15 |
| 1-(4-chlorobenzyl)-2-(1-methyl-4-piperazinyl)-methylbenzimidazole | 116 | 643 | 20 |
| 1-(4-chlorobenzyl)-2-(1-benzyl-4-piperazinyl)-methylbenzimidazole | | 2,000 | 20 |
| 1-(4-bromobenzyl)-2-(1-methyl-4-piperazinyl)-methylbenzimidazole | 109 | 530 | 20 |
| 1-(4-bromobenzyl)-2-[1-(2-hydroxyethyl)-4-piperazinyl]-methylbenzimidazole | 110 | 595 | 20 |
| 1-(4-methoxyethoxybenzyl)-2-[1-(2-hydroxyethyl)-4-piperazinyl]-methyl-benzimidazole | 105 | 750 | 20 |
| 1-p-chlorobenzyl-2-pyrrolidyl-methyl-benzimidazole | 140 | 625 | 25 |
| 1,2-diphenyl-3,5-diketo-4-butyl-pyrazolidine | 160 | 270 | 320 |

The benzimidazole derivatives of the invention may be prepared in a manner known by itself from available intermediates. The following examples are illustrative of preferred methods of preparing such compounds.

EXAMPLE 1

1-(4 - chlorobenzyl)-2-chloromethylbenzimidazole hydrochloride was converted into the free base by trituration with water and an excess of sodium bicarbonate. The moist product was purified by carbon treatment and recrystallization from aqueous methanol. It had a melting point of 99–103° C. and will hereinafter be referred to as "Compound A."

45 g. Compound A were dissolved in 240 ml. absolute benzene. The solution was cooled externally with ice water while a solution of 37.2 g. N-methylpiperazine in 40 ml. absolute benzene was added drop by drop. The reaction mixture was stored at ambient temperature for two days while protected against moisture, and it was then washed with water until neutral. The organic phase was dried over potassium carbonate and was evaporated in a vacuum at a temperature not exceeding 30° C. A crystalline residue of crude 1-(4-chlorobenzyl)-2-(1-methyl-4-piperazinyl)-methylbenzimidazole was recrystallized from petroleum ether. The purified crystals weighed 40 g. and had a melting point of 99–100.5° C.

The monochlorohydrate was prepared from the base by dissolving the same in five weights of acetone and adding the calculated amount of hydrochloric acid. The solvent was evaporated in a vacuum. The residue was heated with acetone to the boiling point of the latter whereby it crystallized. The yield was almost quantitative. M.P. 225–226° C.

EXAMPLE 2

A solution of 40 g. Compound A in 300 ml. absolute benzene was mixed in a flask with a solution of 43 g. N-(2-hydroxyethyl)-piperazine in 50 ml. absolute benzene. The temperature of the reaction mixture was held at a maximum of 25° C. by dipping the flask in ice water from time to time. After standing overnight at ambient temperature, the contents of the flask were refluxed for two hours. They were then cooled, washed with water until neutral, and extracted with 1 N HCl. The combined acid extracts were washed twice with ether, decolorized with charcoal, and made alkaline with sodium bicarbonate. The precipitate formed was taken up in methylene chloride, and the solvent extract was dried over desiccated sodium sulfate, and evaporated to dryness at not more than 40° C. The residue was purified by carbon treatment and recrystallization from benzene.

40 g. 1-(4-chlorobenzyl)-2-[1-(2-hydroxyethyl)-4-piperazinyl]-methylbenzimidazole were obtained as colorless crystals. M.P. 144–145° C.

EXAMPLE 3

25 g. 2,5-dichloro-1-nitrobenzene and 36.9 g. 4-chlorobenzylamine were slowly heated to 135° C. in a flask set in an oil bath. An exothermal reaction set in at that temperature, and the flask was cooled as needed to keep the temperature of its contents below 145° C. The reaction was completed after two hours. The reaction mixture was cooled and recrystallized from ethanol. 23 grams 1-(4 - chlorobenzylamino)-2-nitro-4-chlorobenzene were obtained. M.P. 121–122° C.

22 g. of the product were dissolved in 250 ml. dioxane and were hydrogenated with 2 g. Raney nickel at ambient temperature at an initial hydrogen pressure of 115 atmospheres. The hydrogenation mixture was worked up in a conventional manner, and 19 g. 1-(4-chlorobenzylamino)-2-amino-4-chlorobenzene were obtained. M.P. 138–141° C.

10 g. of the hydrogenation product were dissolved in 90 ml. absolute chloroform and were added to a suspension of 6.1 g. chloroacetic acid iminoether chlorohydrate in 35 ml. chloroform. The mixture was stirred at ambient temperature for 30 minutes, and thereafter at 40° C. for two hours. Water was then added with stirring, and the reaction mixture was neutralized with sodium bicarbonate.

The chloroform phase was separated from the aqueous phase, washed with water, and dried over disiccated sodium sulfate. The chloroform was evaporated in a vacuum, and a residue of 10 g. 1-(4-chlorobenzyl)-2-chloromethyl-5-chlorobenzimidazole (M.P. 134–136° C.) was obtained. It was reacted with N-β-hydroxyethyl-piperazine by the method of Example 2. There were obtained 10 g. 1-(4-chlorobenzyl)-2-[1-(2-hydroxyethyl)-4-piperazinyl]-methyl-5-chlorobenzimidazole. M.P. 137–138° C.

When 1-(4 - chlorobenzyl) - 2 - chloromethyl-5-chlorobenzimidazole was reacted with N-methylpiperazine as described in Example 1, 1-(4-chlorobenzyl)-2-(1-methyl-4-piperazinyl) - methyl - 5 - chlorobenzimidazole was obtained in a yield of 83%. The product, when recrystallized from a benzene-benzine mixture had a melting point of 160–161° C.

EXAMPLE 4

75.8 g. 4-chlorobenzyl cyanide were dissolved in 700 ml. methanol saturated with ammonia, and were hydrogenated with 3 g. Raney nickel at an initial hydrogen pressure of 110 atmospheres at a maximum temperature of 70° C. The hydrogenation mixture was worked up in the usual manner, and 56.4 g. 4-chlorophenylethylamine (B.P.$_{14}$ 124–129° C.) were isolated.

49 g. of the hydrogenation product were mixed with 49.5 g. o-chloronitrobenzene and 47.1 g. powdered anhydrous potassium carbonate, and the mixture was held at a temperature of 150–160° C. for three hours by heating in an oil bath. The melt solidified on cooling and was dissolved in chloroform and water. The chloroform phase was washed with dilute aqueous hydrochloric acid, then with water, dried, and evaporated to dryness. The residue was recrystallized from methanol. 69 g. 1-p-chlorophenylethylamino-2-nitrobenzene were obtained.

The compound was hydrogenated with Raney nickel catalyst in methanol to yield 63 g. 1-(4-chlorophenylethylamino)-2 aminobenzene, a viscous oil. The hydrogenated compound was condensed with chloroacetic acid iminoether in the manner described in Example 3 to 1-(4-chlorophenylethyl)-2 - chloromethylbenzimidazole (M.P. 104–107° C.) with a yield of 70 g. 15.2 g. of the last-mentioned compound were reacted with 15.6 g. N-(2-hydroxyethyl)-piperazine, and 16 g. 1-[2-(4-chlorophenyl)-ethyl]-2-[1-(2-hydroxyethyl) - 4 - piperazinyl] - methylbenzimidazole were obtained. M.P. 123–124° C.

EXAMPLE 5

33.1 g. of compound A were added with stirring to a cold mixture of 12.8 g. formylpiperazine, 6.4 g. sodium carbonate, and 150 ml. 95% ethanol. The reaction mixture was first heated gently, and then refluxed for two hours. It was then cooled and filtered, and the filtrate was evaporated to dryness in a vacuum. The oily residue was heated on a water bath for ten hours with 32 ml. hydrochloric acid (d.1.19) and 150 ml. water. Most of the hydrochloric acid was then evaporated in a vacuum, and the residue was stirred into water. The base was precipitated with sodium hydroxide and taken up in methylene chloride. The methylene chloride extract was dried over potassium carbonate and evaporated to dryness. The residue of 1-(4-chlorobenzyl)-2-(4-piperazinyl)-methylbenzimidazole was recrystallized from ethyl acetate. The yield was 20 g. M.P. 140–142° C.

EXAMPLE 6

17.7 g. o-phenylenediamine were dissolved in 45 ml. methanol, and a few drops piperidine were added to the solution which was cooled with ice water. A solution of 20.8 g. 4-fluorobenzaldehyde in 45 ml. methanol was added drop by drop. The condensation product was precipitated after a while and was filtered off with suction. A second crystal crop was recovered when the filtrate was partly evaporated. Altogether, 30 g. N-(4-fluorobenzal)-o-phenylenediamine (M.P. 73–74° C.) were obtained. The compound can be recrystallized from cyclohexane.

37.5 g. N-(4-fluorobenzal)-o-phenylenediamine were dissolved in 500 ml. dioxane, and the solution was treated in a shaking flask with hydrogen at a pressure of 130 atmospheres at 70–75° C. in the presence of 4 g. Raney nickel for several hours. The catalyst was removed from the hydrogenation mixture by filtration, and the filtrate was evaporated in the vacuum of a water jet pump at a temperature not exceeding 35° C. The residue consisted of 37.5 g. crystalline N-(4-fluorobenzyl)-o-phenylenediamine. M.P. 80–81° C.

28.6 g. chloroacetic acid iminoether hydrochloride were suspended in 164 ml. anhydrous chloroform. A solution of 37.5 g. N-(4-fluorobenzyl)-o-phenylenediamine in 208 ml. anhydrous chloroform were added drop by drop to the suspension while atmospheric moisture was carefully excluded. The reaction mixture was kept at room temperature by external cooling with water. When mixing was completed, the reaction mixture was stirred 30 minutes at room temperature, and thereafter two hours at 40° C.

The solution obtained was mixed with water while being cooled with ice. It was neutralized by addition of a few milliliters of sodium bicarbonate solution. The aqueous phase was discarded, and the chloroform solution was washed three times with water, dried over sodium sulfate, and evaporated in a vacuum. The residue consisted of 46 g. 1-(4-fluorobenzyl)-2-chloromethylbenzimidazole having a melting point of 80–84° C.

15 grams of the last-mentioned compound were dissolved in 120 ml. absolute benzene, and a solution of 17.3 g. N-(2-hydroxyethyl)-piperazine in 50 ml. absolute benzene was added drop by drop under anhydrous conditions with ice cooling. The reaction mixture was left to stand overnight, and was then refluxed for two hours. It was thereafter washed with water until neutral, dried over potassium carbonate, and the solvent was evaporated in a vacuum. The crystalline residue was recrystallized from ethyl acetate with charcoal addition. There were obtained 13 g. 1 - (4-fluorobenzyl)-2-[1-(2-hydroxyethyl)-4-piperazinyl]-methylbenzimidazole of M.P. 143–144° C.

EXAMPLE 7

A method analogous to that of Example 6 was employed for the preparation of 1-(4-fluorobenzyl)-2-(1-methyl - 4 - piperazinyl) - methylbenzimidazole. The free base could not be crystallized. It was readily converted to the monochlorohydrate in the following manner:

16.5 g. of the free base were dissolved in 48.7 ml. 1-N hydrochloric acid. The solution was purified with charcoal and evaporated in a vacuum. The residue crystalized after having been heated to a boil with absolute ether. It was recrystallized with charcoal treatment from a mixture of methanol and ether. There were obtained 11 g. 1-(4-fluorobenzyl) - 2 - (1-methyl-4-piperazinyl)-methylbenzimidazole hydrochloride of M.P. 233–234° C.

EXAMPLE 8

Compound A was reacted with morpholine in the manner of Example 2. The base obtained (M.P. 100–102° C.) was converted to the hydrochloride in the manner described above. The 1-(4-chlorobenzyl) - 2 - [(4-morpholinyl)-methyl]-benzimidazole hydrochloride of M.P. 209–210° C. was obtained after recrystallization from methanol in a yield of 60%.

Other benzimidazole derivatives were prepared from Compound A by reaction with amines in a manner obvious from the preceding examples. The method of Example 3 was employed to prepare 1-(4-chlorobenzyl)-2-[1 - (2-methoxyethyl) - 4 - piperazinyl]-methylbenzimidazole hydrochloride which has a M.P. of 127–129° C. after recrystallization from a mixture of methanol and ether. 1-(4-chlorobenzyl) - 2 - (1-benzyl-4-piperazinyl)-methylbenzimidazole was prepared as the free base by the method of Example 5. It had a melting point of 147–148° C. after recrystallization from acetone.

EXAMPLE 9

Various aromatic aldehydes were converted to the corresponding benzal or analogous pyridyl formal derivatives of o-phenylenediamine according to the method of Example 6, which were further hydrogenated to the benzyl or pyridyl methyl compounds and condensed to a 1-substituted-2-chloromethylbenzimidazole as described in that example. Condensation with N-methylpiperazine or N-(2-hydroxyethyl)-piperazine in the manner of Example 2 then yielded compounds of the invention. For the sake of brevity, only the aldehyde employed, the melting points of (1) the benzal derivative, (2) of the benzyl derivative obtained by hydrogenation, and (3) of the chloromethylbenzimidazole derivative, and the solvent employed in recrystallizing the ultimate compound of the invention are listed under the name and melting point of the compound in each of the following paragraphs.

(a) 1-(4-bromobenzyl) - 2 - (1-methyl-4-piperazinyl)-methylbenzimidazole, M.P. 96–97° C. Aldehyde: 4-bromobenzaldehyde. M.P. (1) 112–113° C., (2) 69–72° C., (3) 95–98° C. Solvent: benzene.

(b) 1 - (4-bromobenzyl) - 2 - [1-(2-hydroxyethyl)-4-piperazinyl]-methylbenzimidazole, M.P. 139–140° C. Aldehyde: 4-bromobenzaldehyde. M.P. (1) 112–113° C., (2) 69–72° C., (3) 95–98° C. Solvent: benzene.

(c) 1-(3-chlorobenzyl) - 2 - [1-(2-hydroxyethyl-4-piperazinyl]-methylbenzimidazole, M.P. 158–159° C. Aldehyde: 3-chlorobenzaldehyde. M.P. (1) 50–52° C., (2) oil, (3) not crystallized. Solvent: benzene.

(d) 1 - (2-chlorobenzyl) - 2 - [1-(2-hydroxyethyl)-4-piperazinyl]-methylbenzimidazole, M.P. 142–145° C. Aldehyde: 2-chlorobenzaldehyde. M.P. (1) 115–116° C., (2) and (3) not crystallized. Solvent: benzene.

(e) 1-(2-chlorobenzyl) - 2 - (1-methyl-4-piperazinyl)-methylbenzimidazole, M.P. 142–143° C. Aldehyde: 2-chlorobenzaldehyde. M.P. (1) 115–116° C., (2) and (3) not crystallized. Solvent: cyclohexane.

(f) 1-(2-fluorobenzyl) - 2 - [1-(2-hydroxyethyl)-4-piperazinyl]-methylbenzimidazole, M.P. 148–149° C. Aldehyde: 2-fluorobenzaldehyde. M.P. (1) 87–89° C., (2) not crystallized, (3) 69–74° C. Solvent: benzene.

(g) 1-(2,4-dichlorobenzyl) - 2 - [1-(2-hydroxyethyl)-4-piperazinyl]-methylbenzimidazole, M.P. 173–174° C. Aldehyde: 2,4-dichlorobenzaldehyde. M.P. (1) 100–101° C., (2) paste, (3) 118–122° C. Solvent: benzene.

(h) 1-(2,6 - dichlorobenzyl)-2-[1-(2-hydroxyethyl)-4-piperazinyl] - methylbenzimidazole, 105–106° C. Aldehyde: 2,6-dichlorobenzaldehyde. M.P. (1) 107° C., (2) 79° C., (3). Solvent: Purified by conversion to HCl salt, and reconversion to base.

(i) 1-(2,6-dichlorobenzyl)-2-(1-methyl-4-piperazinyl)-methylbenzimidazole hydrochloride, 227–228° C. Aldehyde: 2,6-dichlorobenzaldehyde. M.P. (1) 108–109° C., (2) 85–86° C., (3) 138° C. Solvent: isopropanol.

(j) 1 - benzyl-2-(1-methyl-4-piperazinyl)-methylbenzimidazole, 121–122° C. Aldehyde: benzaldehyde. M.P. (1) 57–61° C., (2) 79–80° C., (3) 111° C. Solvent: ethyl acetate.

(k) 1-benzyl - 2 - [1-(2-hydroxyethyl)-4-piperazinyl]-methylbenzimidazole, M.P. 138–139° C. Aldehyde: benzaldehyde. M.P. (1) 57–61° C., (2) 79–80° C., (3) 111° C. Solvent: benzene.

(l) 1 - (4-methoxyethoxybenzyl) - 2 - [1-(2-hydroxyethyl)-4-piperazinyl]-methylbenzimidazole, M.P. 84–86° C. Aldehyde: 4 - (2 - methoxyethyl)-benzaldehyde. M.P. (1) 116–118° C., (2) oil, (3) 72° C. Solvent: petroleum ether-benzene.

(m) 1-(2-hydroxy-3,5-dichlorobenzyl) - 2 - [1-(2-hydroxyethyl) - 4 - piperazinyl]-methylbenzimidazole, M.P. 191–192° C. Aldehyde: 2-hydroxy-3,5-dichlorobenzaldehyde. M.P. (1) 140–141° C., (2) 136–138° C., (3) 174–176° C. Solvent: methanol-ethyl acetate.

(n) 1-(2-hydroxybenzyl) - 2 - [1-(2-hydroxyethyl)-4-piperazinyl]-methylbenzimidazole, M.P. 217–218° C. Aldehyde: 2-hydroxybenzaldehyde. M.P. (1) 67–69° C., (2) 155–157° C., (3) 172–175° C. Solvent: methanol.

(o) 1 - (2-methoxybenzyl)-2-[1-(2-hydroxyethyl)-4-piperazinyl]-methylbenzimidazole, M.P. 90–91° C. Aldehyde: 2-methoxybenzaldehyde M.P. (1) 99–101° C., (2) 66–67° C., (3) 108–110° C. Solvent: ethyl acetate.

(p) 1 - (2-methoxybenzyl)-2-(1-methyl-4-piperazinyl)-methyl-benzimidazole, M.P. 143–144° C. Aldehyde: 2-methoxybenzaldehyde M.P. (1) 99–101° C., (2) 66–67° C., (3) 108–110° C. Solvent: cyclohexane.

(q) 1 - (2 - methylbenzyl) - 2 - (1 - methyl - 4 - piperazinyl)-methyl-benzimidazole, M.P. 128–130° C. Aldehyde: 2-methylbenzaldehyde M.P. (1) 102–103° C., (2) 74–78° C., (3) 78–79° C. Solvent: cyclohexane.

(r) 1 - (4 - pyridylmethyl) - 2 - [1 - (2 - hydroxyethyl)-4-piperazinyl]-methylbenzimidazole, M.P. 167–169° C. Aldehyde: isonicotinaldehyde M.P. (1) 121–122° C., (2) not crystallized, (3) 233–241° C. Solvent: dioxane.

(s) 1 - (2 - pyridylmethyl) - 2 - [1 - (2 - hydroxyethyl)-4-piperazinyl]-methylbenzimidazole, M.P. 156–159° C. Aldehyde: picolinaldehyde M.P. (1), (2), and (3) not crystallized. Solvent: dioxane.

EXAMPLE 10

15 g. o-chloronitrobenzene, 6 g. 4-fluoroaniline, and 15 g. sodium acetate were well mixed. The mixture was heated to 200–210° C. for ten hours, and then cooled to ambient temperature. Dilute hydrochloric acid was added, and the excess of chloronitrobenzene was removed by steam distillation. The residue was again cooled, and the crystals precipitated were filtered off with suction. They were recrystallized from aqueous ethanol. 6 g. 4'-fluoro-2-nitrodiphenylamine of M.P. 82–83° C. were obtained.

25 g. of the last mentioned compound were dissolved in 100 ml. dioxane and were hydrogenated in the presence of 1 g. Raney nickel at ambient temperature and at an initial hydrogen pressure of 115 atmospheres. The hydrogenation mixture was worked up in the usual manner to yield 22 g. 4'-fluoro-2-aminodiphenylamine (M.P. 64–65° C.).

22 g. of the hydrogenation product were condensed with chloracetic acid iminoether hydrochloride as described in Example 6, and 26 g. 1-(4-fluorophenyl)-2-chloromethyl-benzimidazole were obtained. M.P. 110–111° C.

9 g. of the last-mentioned compound were dissolved in 30 ml. absolute ethanol. The solution was added drop by drop over a period of 30 minutes to a solution of an equivalent amount of 2-amino-2'-hydroxydiethyl ether in absolute alcohol, moisture being carefully excluded. The mixture was then refluxed for 2½ hours. The alcohol was distilled off in a vacuum in a nitrogen atmosphere, and the residue was dissolved in methylene chloride. The solution so obtained was washed with water until neutral, dried over sodium sulfate, and evaporated to dryness in a vacuum.

Crystalline 1-(4-fluorophenyl)-2-[1-(2-hydroxyethyl)-4-piperazinyl]-methylbenzimidazole was obtained in a yield of 6 g. The melting point was 115–116° C. after recrystallization from ethyl acetate.

1 - (4 - fluorophenyl) - 2 - (1 - methyl - 4 - piperazinyl)-methylbenzimidazole was prepared in an analogous manner and had a melting point of 131–132° C. when recrystallized from ethyl acetate.

EXAMPLE 11

1-(4-chlorophenyl)-2-chloromethylbenzimidazole was prepared in manner analogous to the procedure of Example 10 (M.P. 119–121° C.) and was reacted with N-(2-hydroxyethyl)-piperazine as described in Example 2. The 1 - (4 - chlorophenyl) - 2 - [1 - (2 - hydroxyethyl) - 4- piperazinyl]-methylbenzimidazole obtained had a melting point of 156–158° C. when crystallized from ethyl acetate.

When 1-(4-chlorophenyl)-2-chloromethylbenzimidazole was reacted with N-methylpiperazine in an analogous manner, 1-(4-chlorophenyl)-2-(1-methyl-4-piperazinyl)-methyl-benzimidazole was obtained. M.P. 167–169° C. after recrystallization from ethyl acetate.

EXAMPLE 12

1 - [2 - (4 - chlorophenyl) - ethyl] - 2 - chloromethylbenzimidazole was prepared as described in Example 4, and was reacted with N-methylpiperazine in the manner of the preceding example. The 1-[2-(4-chlorophenyl)-ethyl] - 2 - (1 - methyl - 4 - piperazinyl) - methylbenzimidazole obtained in a yield of 90% had a melting point of 122–123° C. when recrystallized from cyclohexane.

EXAMPLE 13

A mixture of 11.9 g. 1-(4-chlorophenyl)-ethylamine, 11.3 g. chloronitrobenzene, and 9.8 g. potassium carbonate was heated to 170–180° C. for five hours in a bath of molten metal. The reaction mixture was cooled to ambient temperature and taken up in water and ethyl ether. The ether phase was washed with dilute hydrochloric acid and then with water until neutral, dried, and evaporated. When the residue was ground in a mortar with isopropanol, it crystallized, and 14 g. of N-(2-nitrophenyl)-N-[1-(4-chlorophenyl)-ethyl]amine were recovered as yellow crystals of M.P. 56–57° C. The $NO_2$-radical of the compound was hydrogenated as described in Example 10.

The resulting N-(2-aminophenyl)-N-[1-(4-chlorophenyl)-ethyl]-amine was obtained as an oil, and was condensed with chloracetic acid iminoether hydrochloride as in Example 6 to 1-[1-(4-chlorophenyl)-ethyl]-2-chloromethylbenzimidazole, which also could not be crystallized, and was employed in the next step.

18 g. of the condensation product were dissolved in anhydrous chloroform. A solution of 18.4 g. N-(2-hydroxyethyl)-piperazine in 100 ml. absolute chloroform were added drop by drop. The reaction mixture was left to stand overnight, refluxed for three hours, cooled to ambient temperature, and washed with water until neutral. The neutral solution was extracted with hydrochloric acid, the aqueous extract was purified with activated charcoal and shaken with ether. It was then made strongly alkaline with sodium hydroxide to precipitate the crude free base 1-[1-(4-chlorophenyl)-ethyl]-2-[1-(2-hydroxyethyl) 4-piperazinyl]-methylbenzimidazole. The base was taken up in ethylene chloride and recovered as described in the preceding examples. Yield 9 g., M.P. 149–150° C.

EXAMPLE 14

A solution of 10.8 g. o-phenylenediamine and of 8.14 g. 4-nitrobenzyl chloride in 150 ml. ethanol was refluxed for two hours, and evaporated to dryness thereafter. The residue was triturated with water and dried. 10.4 g. N-(4-nitrobenzyl)-o-phenylenediamine of M.P. 136–139° C. were obtained. The latter compound was converted to 1-(4-nitrobenzyl)-2-chloromethylbenzimidazole by the procedure of Example 6, and 1-(4-nitrobenzyl)-2-(1-methyl-4-piperazinyl)-methylbenzimidazole of M.P. 159–161° C. was prepared according to the method of Example 2 in a 60% yield. The compound was recrystallized from benzene.

1-(2-nitrobenzyl)-2-chloromethylbenzimidazole (M.P. 158–160° C.) was prepared in an analogous manner, and was reacted with N-methylpiperazine to 1-(2-nitrobenzyl)-2 - (1 - methyl - 4 - piperazinyl) - methylbenzimidazole (M.P. 182–183° C.) in a 62% yield. The last-mentioned compound was recrystallized from aqueous methanol.

EXAMPLE 15

23.3 g. N-(4-chlorobenzyl)-o-phenylenediamine and 16.3 g. α-chloropropionic acid were dissolved in 100 ml. 4 N hydrochloric acid. The solution was refluxed for three hours under nitrogen, cooled with ice water, and the resulting precipitate was separated from the liquid. It consisted of 34.1 g. of a darkly colored, non-crystalline material which was reacted with N-(2-hydroxyethyl)-piperazine as described above in Example 2 to yield a base which could not be crystallized. It was converted to the monohydrochloride in the aforedescribed manner.

There were obtained 10 g. 1-(4-chlorobenzyl)-2-[1-(2-hydroxyethyl)-4-piperazinyl]-ethylbenzimidazole hydrochloride of M.P. 193–195° C.

EXAMPLE 16

16.1 g. N-p-toluenesulfonyl-2-nitro-4-methoxyaniline were suspended in 12.5 ml. 4 N sodium hydroxide solution, and 6.45 g. p-chlorobenzyl chloride were added to the suspension. The mixture was refluxed with agitation for four hours, whereupon an additional 9.45 g. of p-chlorobenzyl chloride were added, and refluxing was continued. The mixture showed an acid reaction after 45 minutes. 2.7 ml. of a 35% NaOH solution were then added, and stirring and heating were continued. The total refluxing time was 8½ hours. After standing overnight, the reaction mixture was repeatedly extracted with ether, and the combined extracts were washed with water, dried, and partly evaporated. The N-4-chlorobenzyl-N-2-nitro-4-methoxyphenyl-p-toluenesulfonamide crystallized from the concentrated solution, was recovered by filtration with suction, washed with cold ether, and recrystallized from ethanol. The yield was 15 g., the melting point 122–123° C.

30 g. of the sulfonamide were dissolved at 50–60° C. in 440 ml. propionic acid. The solution was cooled to 20° C., and 28.2 ml. concentrated sulfuric acid were added with external ice cooling. The reaction mixture then was heated on a steam bath for 90 minutes to a temperature of about 93° C., and then poured over ice. A sludge was precipitated and solidified within a few hours. It was filtered off with suction, broken up, and dissolved in two liters hot methanol. The solution obtained was evaporated until crystallization started, then cooled, and separated from the crystals formed by filtration. 12.5 g. N-4-chlorobenzyl-N-2-nitro-4-methoxyphenylamine were obtained as red crystals melting at 129–130° C.

30 g. of the last-mentioned compound were dissolved in 300 ml. dioxane, and were hydrogenated with a Raney nickel catalyst in the presence of a few drops of pyridine at ambient pressure. The hydrogenation mixture was worked up in the usual manner, and 26 g. N-4-chlorobenzyl-N-2-amino-4-methoxyphenylamine having a melting point of 92–93° C. were recovered after recrystallization from a benzine-benzene mixture.

The latter compound was converted to 1-(4-chlorobenzyl)-2-chloromethyl-5-methoxybenzimidazole in the manner of Example 6. 13 g. of the chloromethyl derivative having a melting point of 122–123° C. after recrystallization from methanol were obtained from an equal weight of the amine.

The chloromethyl derivative was reacted with N-2-hydroxyethylpiperazine as described in Example 2 to produce 1-(4-chlorobenzyl)-2-[1-(2-hydroxyethyl)-4-piperazinyl]-methyl-5-methoxybenzimidazole in a yield of 80%. M.P. 106–110° C.

1 - (4 - chlorobenzyl) - 2 - (1 - methyl - 4 - piperazinyl) - methyl-5-methoxybenzimidazole dichlorohydrate, M.P. 175° C., was prepared in an analogous manner.

EXAMPLE 17

The method described in Example 9 (n) of preparing 1 - (2 - hydroxybenzyl) - 2 - [1 - (2 - hydroxyethyl) - 4 - piperazinyl]-methylbenzimidazole was used in synthesizing 1 - (2 - hydroxybenzyl) - 2 - (1 - methyl - 4 - piperazinyl) - methylbenzimidazole (M.P. 243–245° C.). 18 g. of the compound were held suspended at ambient temperature for five hours in 150 ml. acetic anhydride by agitation, until the solids dissolved. The excess anhydride was distilled off in a vacuum, and the residue was mixed with ice water to destroy residual acetic anhydride. The solution was then neutralized with sodium bicarbonate, and the base formed was precipitated with dilute sodium hydroxide. The precipitate was filtered off, taken up in methylene chloride and worked up in the usual manner. 18 g. 1-(2-acetoxybenzyl)-2-(1-methyl-4-piperazinyl)-methylbenzimidazole, M.P. 145–147° C., were obtained after recrystallization from a pentane-benzene mixture.

When 1-(2-hydroxybenzyl)-2-[1-(2-hydroxyethyl)-4-piperazinyl]-methylbenzimidazole was subjected to the same sequence of steps, there was obtained 1-(2-acetoxybenzyl) - 2 - [1 - (2 - acetoxyethyl) - 4 - piperazinyl] - methylbenzimidazole having a melting point of 101–102° C. 1-(4-chlorobenzyl)-2-[1-(2-acetoxyethyl)-4-piperazinyl]-methylbenzimidazole having a melting point of 78–80° C. was prepared in an analogous manner.

EXAMPLE 18

10 g. N-4-chlorobenzyl-o-phenylenediamine were mixed in a flask with 4.6 g. glycolic acid. The flask was slowly heated to 100° C. in an oil bath while connected to a water jet vacuum pump. Water was liberated in the ensuing reaction which was brought to completion by gradually increasing the temperature to 135° C., and by maintaining this temperature for one hour. The reaction mixture was permitted to cool, and was then dissolved in hot alcohol, and an amount of water just short of causing a permanent precipitate was added. Sodium carbonate solution was added next, and the mixture was cooled with ice water. The 1 - (4-chlorobenzyl)-2-hydroxymethylbenzimidazole was thereby precipitated. It was filtered off with suction, washed with water, and was recrystallized in the moist condition from aqueous ethanol. M.P. 131–132° C. The yield was 10 g.

This material was mixed with 40 ml. thionyl chloride while being cooled externally with ice water. The mixture was then refluxed for four hours under a nitrogen blanket, and the excess of thionyl chloride was distilled off in a vacuum. The residue was dried in a vacuum desiccator over potassium hydroxide. It was then converted to the free base by means of sodium bicarbonate as described in Example 1. 10 g. of Compound A were obtained (M.P. 100–102° C.) which may then be converted to the compounds of the invention as described in Example 2.

EXAMPLE 19

67.8 g. methyl gamma-bromobutyrate and 87.05 g. morpholine were refluxed in 392 ml. absolute toluene for 3½ hours in an anhydrous atmosphere. The reaction mixture was cooled and a precipitate of 65 g. morpholine hydrobromide was recovered (77.5% yield). Toluene was evaporated from the filtrate in a vacuum, and a yellow oily residue was obtained. It was dissolved in 570 ml. methanol and 68.0 ml. 6.0 N potassium hydroxide solution were added. The mixture was kept at room temperature for 30 minutes, and was then refluxed for one hour. It was cooled, and 68.0 ml. 6.0 N hydrochloric acid were added, whereby potassium chloride was precipitated. It was removed by filtration and washed with methanol. The combined filtrate and washings were evaporated in a vacuum, and the residue was taken up in chloroform, leaving some potassium chloride undissolved. The chloroform solution was filtered and evaporated to dryness in a vacuum. The residue became crystalline after trituration with absolute ether or pentane. There were obtained 62 g. gamma-morpholinobutyric acid monohydrate having a melting point of 73–74° C.

10.5 g. of the compound and 11.6 g. N-4-chlorobenzyl-o-diphenylenediamine were jointly dissolved in a mixture of 12.7 ml. water, 3.2 ml. ethanol, 2.4 ml. conc. hydrochloric acid, and 2.4 ml. conc. phosphoric acid.

The solution was heated in an open flask under a nitrogen blanket until its temperature rose to 135–140° C. This temperature was maintained for two hours, whereupon the reaction mixture was cooled to ambient temperature, and mixed with water. Insoluble fractions were removed by filtration, and the violet-colored filtrate was decolorized by means of charcoal. It was then rendered alkaline with ammonium hydroxide solution, whereby an oil was precipitated. The mixture was extracted repeatedly with ether, and the combined ether extracts were washed until neutral, dried, and evaporated.

9.1 g. 1-(4-chlorobenzyl)-2-[3-(4-morpholinyl)propyl] benzimidazole of M.P. 118–119° C. were obtained.

The free base was converted into the corresponding hydrochloride by dissolving 3.7 g. (0.01 mol) of the base in 10 ml. 1 N hydrochloric acid. The solution was purified by carbon treatment, and was kept in a vacuum desiccator over potassium hydroxide and phosphorus pentoxide until no further weight loss could be found. The crystalline material obtained was again purified by carbon treatment and recrystallized from chloroform. The yield of 1-(4-chlorobenzyl)-2-[3-(4 - morpholinyl)propyl] benzimidazole hydrochloride was 3.5 g. M.P. 171–173° C.

It will be understood that the hydrochloride can be obtained in the same manner from any other free base of the invention, and that the hydrochloride of any base of the invention can be converted to the free base by the simple procedure described in Example 1. Salts of sulfuric acid are obtained by evaporating solutions of the base and of an equivalent amount of sulfuric acid in a common solvent, and salts of other acids are prepared in the same manner. The physiological effects of the salts are not significantly affected by the nature of the anionic components.

The compounds of the present invention are valuable pharmaceuticals. They are especially useful against any kind of hypersensitivity and allergy, such as urticaria, pruritus, hayfever, vasomotor rhinitis, allergic conjunctivitis, bronchitis with asthma, allergic and itching skin rashes, endogenous and exogenous dermatitis, eczema, insect bites, burns, vasomotoric spasms, migraine and allergic-inflammatory algesies.

The compounds of the invention may be administered after having combined them with known excipients, carriers, flavoring agents and the like in a conventional manner. Those skilled in the art will not require further guidance for incorporating the compounds in powder compositions, tablets, pills, suspensions, ointments or solutions as is customary.

The compounds of the present invention are to be administered in a dosage range between 0.1 and 20.0 mg. per kg. bodyweight.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. 1-(2 - hydroxybenzyl)-2 - (4 - hydroxyethyl - piperazino)-methylbenzimadazole.

2. 1-(4 - chlorobenzyl)-2-(4-ethyl-piperazino)-methylbenzimidazole.

3. 1-(2 - hydroxybenzyl)-2-(4 - methyl - piperazino)-methylbenzimidazole.

4. A compound of the formula
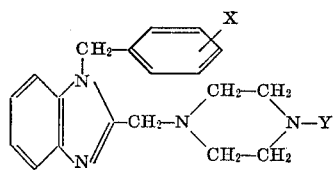
wherein X is a hydroxyl group in ortho position or a chlorine atom in para position, and Y is a methyl or hydroxyethyl group.
References Cited
UNITED STATES PATENTS
3,288,785 11/1966 Kuntscher et al. ____ 260—239.1
ALEX MAZEL, *Primary Examiner.*
J. TOVAR, *Assistant Examiner.*
U.S. Cl. X. R.
260—247.5, 247.2, 999